United States Patent [19]

Bourke

[11] 4,301,396

[45] Nov. 17, 1981

[54] THERMAL CURRENT LIMITING CONTROLLER

[75] Inventor: Robert F. Bourke, Kamiah, Id.

[73] Assignee: Gould Inc., Rolling Meadows, Ill.

[21] Appl. No.: 943,627

[22] Filed: Sep. 19, 1978

[51] Int. Cl.³ .............................................. H02P 5/16
[52] U.S. Cl. .................................... 318/490; 318/139; 318/334; 318/471; 340/648; 340/692
[58] Field of Search ............... 318/334, 471, 472, 473, 318/490, 139; 361/25; 340/648, 664, 692, 679, 595, 584, 588; 73/355

[56] References Cited

U.S. PATENT DOCUMENTS

| | | | |
|---|---|---|---|
| 2,740,108 | 3/1956 | Plympton, Jr. et al. | 340/692 |
| 3,287,975 | 11/1966 | Mason et al. | 340/584 |
| 3,711,845 | 1/1973 | Chasek | 340/584 |
| 3,735,291 | 5/1973 | Kahn et al. | 361/25 |
| 3,808,516 | 4/1974 | Hentschel | 318/471 |
| 3,809,960 | 5/1974 | Jossic | 361/25 |
| 3,860,861 | 1/1975 | Gucker | 318/473 |
| 3,868,554 | 2/1975 | Konrad | 318/334 |
| 3,989,900 | 11/1976 | Thompson | 318/139 |
| 4,001,649 | 1/1977 | Young | 340/664 |
| 4,032,895 | 6/1977 | Klimo | 318/341 |

OTHER PUBLICATIONS

"Electronic Motor Protection Relay Eliminates Overload Breakdowns", *Design Engineering*, Aug. 1975, p. 13.

*Primary Examiner*—David Smith, Jr.
*Attorney, Agent, or Firm*—Wegner, Stellman, McCord, Wood & Dalton

[57] ABSTRACT

A thermal current limiting controller for use in protecting the electric drive motor, controller and battery of an electrically propelled vehicle against damage thereto resulting from excessive temperature conditions. The controller is arranged to calculate the temperature condition of the motor as a function of the current flow therethrough and more specifically, integrates the current flow with respect to time so as to provide a control signal proportional to the calculated temperature condition. The control signal is utilized to limit the amount of current the drive motor is permitted to draw notwithstanding an attempt by the operator of the vehicle to cause the drive motor to draw greater current. The controller further includes an indicator which is responsive to the control signal to provide a variable indication of the temperature condition so as to warn the vehicle operator of the magnitude of the undesirable heating of the drive motor and, thus, the impairment of the system capabilities.

19 Claims, 1 Drawing Figure

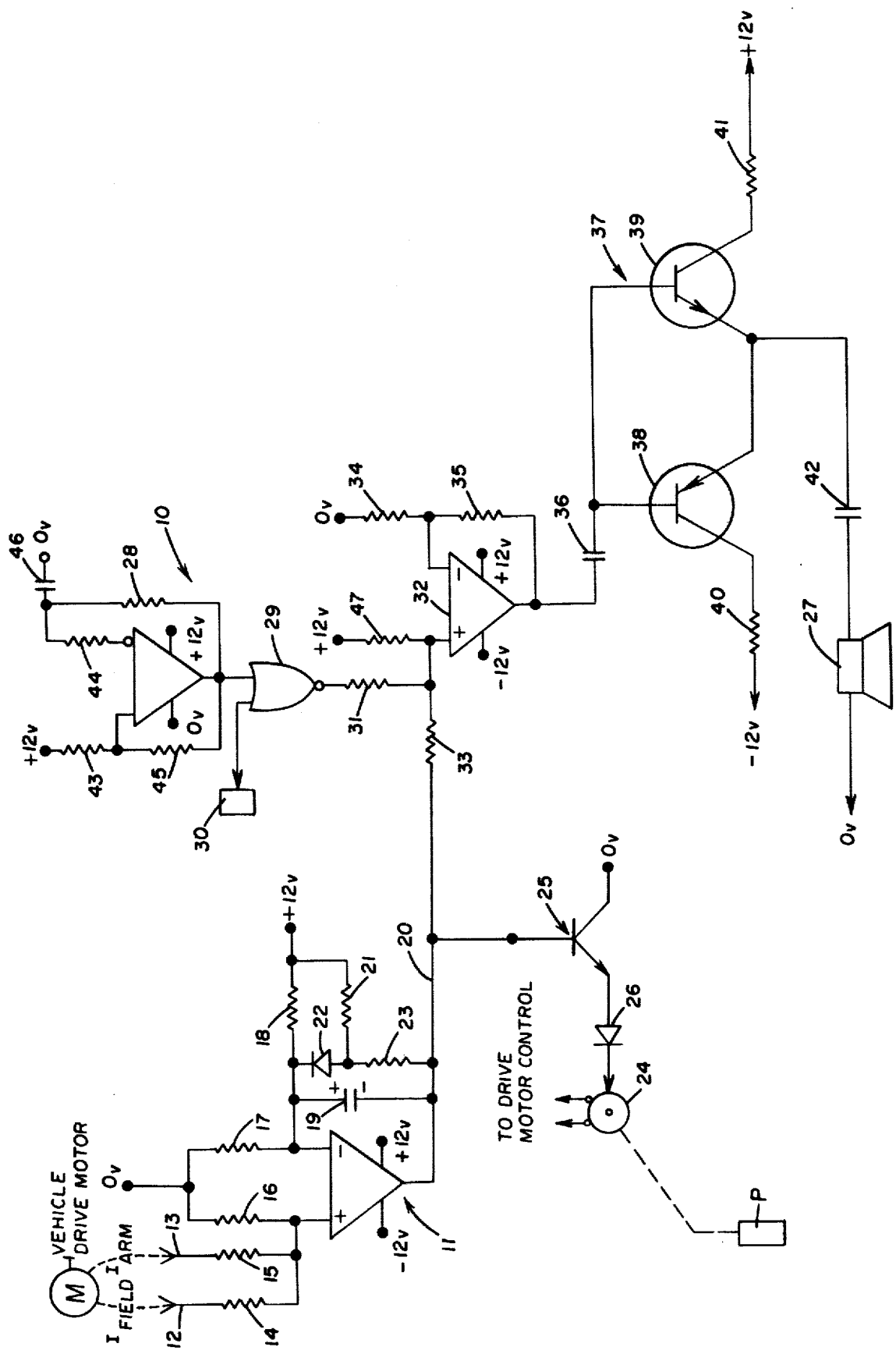

THERMAL CURRENT LIMITING CONTROLLER

BACKGROUND OF THE INVENTION

1. Field of the Invention

This invention relates to electric vehicles and in particular to means for controlling and indicating the temperature condition of the electric drive motor of the vehicle.

2. Description of the Prior Art

In the conventional electrically controlled vehicle, the operation of the vehicle is controlled by suitable means, such as an accelerator pedal, to vary the amount of current to the electric drive motor and, thus, the power developed thereby. At times, the vehicle operator may require that the motor develop a high power, such as during acceleration or climbing grades, etc. It is desirable to permit such high power operation for a period of time while yet preventing the continuing of such high power operation to the extent that the motor becomes overheated and, thus, is damaged.

As a concomitant of such desideratum, it is desirable to provide some indication to the vehicle operator of the temperature condition of the motor so as to advise the operator as to the possible impairment of the system capabilities resulting from high power operations causing an elevation in the temperature of the motor.

One improved form of electrically propelled vehicle illustrating a control for controlling the operational speed of the vehicle is disclosed in U.S. Pat. No. 4,008,423 of Clinton C. Christianson et al, which patent is owned by the assignee hereof.

SUMMARY OF THE INVENTION

The present invention comprehends an improved controller for use in such an electrically propelled vehicle arranged to prevent damage to the drive motor while yet permitting the vehicle operator to cause high powered operation of the vehicle for limited times.

More specifically, the controller of the present invention is arranged to provide an automatic limitation on the amount of current drawn by the motor as a function of a calculated temperature condition resulting from previous high current operation.

The thermal current limiting controller of the present invention is arranged to integrate the motor current with respect to time. As a means of providing an indication of power applied to the motor and therefore the heat losses in the motor. In the illustrated embodiment, a first order approximation of the relationship between motor head and motor current is utilized, it being obvious to those skilled in the art more precise correlation may be utilized. The integrated signal defines a control signal for use in providing a corresponding automatic limitation on the amount of current the motor is permitted to draw in the operation of the vehicle notwithstanding an attempt by the operator to cause the motor to draw a greater current.

In the illustrated embodiment, a time constant circuit is utilized to determine a preselected period of time during which the integrated currents are determined. The invention comprehends the utilization of a plurality of different ones of such time constant integrating circuits so as to permit the control signal to be developed with respect to different preselected thermally limited components within the system. Illustratively, the time constant may be selected to provide a time integral of approximately one and one-half minutes, which matches armature heating. Illustratively, a shorter time constant of approximately six seconds may be utilized as a relatively fast time constant where relatively short duration, high current conditions are required momentarily but would be prevented by the slow time constant.

The invention contemplates the provision of the control signal developed by the current integrating means to override the setting of the drive motor current control attempted to be made by the vehicle operator where the temperature conditions require such an overriding action. In the illustrated embodiment, the acceleration is voltage responsive and the control signal is arranged to effect an overriding adjustment of the voltage to provide the desired limitation on the motor current.

Concurrently with the control of the motor current, the thermal current limiting controller of the present invention provides a sensible indication of the vehicle operator of the thermal condition of the motor so as to advise the operator of any impairment of the maximum system capabilities as represented by an elevation of the drive motor temperature above the normal rated temperature and short of the maximum rated temperature. In the illustrated embodiment, the signal comprises an audio signal which is caused to vary in loudness as a direct function of the calculated system capability impairment, or the calculated motor temperature elevation. Thus, the controller not only indicates to the operator of the vehicle that impairment of the capabilities has occurred, but provides a positive indication of the amount of such impairment existing at any given time.

The controller is extremely simple and economical of construction while yet providing the highly desirable features discussed above.

BRIEF DESCRIPTION OF THE DRAWING

Other features and advantages of the invention will be apparent from the following description taken in connection with the accompanying drawing which is a schematic wiring diagram of a thermal current limiting controller circuit embodying the invention.

DESCRIPTION OF THE PREFERRED EMBODIMENT

In the exemplary embodiment of the invention as disclosed in the drawing, an improved thermal current limiting controller is illustrated for use in preventing overheating the drive motor of an electrically propelled vehicle such as disclosed in Christianson et al U.S. Pat. No. 4,008,423. Controller 10 is arranged to prevent excessive temperature conditions in the drive motor by effectively predicting the occurrence thereof as a function of the armature and field currents of the motor, $I_{Arm}$ and $I_{Field}$, respectively. The controller effectively limits the power which can be drawn by the vehicle drive motor in accordance with a calculated determined thermal condition based on the determined motor currents so as to prevent the vehicle operator from excessively overloading the drive motor by making excessive power demands thereon as through manipulation of the conventional vehicle accelerator pedal P.

More specifically, as shown in the wiring diagram, the circuit of controller 10 is powered from the vehicle power supply illustrated as a conventional $+12$ v, $-12$ v, 0v supply and includes an input operational amplifier generally designated 11 defining means for integrating with respect to time a signal corresponding to the field current of the motor and a signal corresponding to the armature current of the motor delivered to the amplifier through input terminals 12 and 13, respectively. The current is delivered to the noninverting input terminal of the amplifier through limiting resistors 14 and 15, respectively. A pair of scaling resistors 16 and 17 are connected in parallel across the input of the amplifier for providing the desired scale in the output.

The time constant of the controller circuit is determined by an RC circuit including the thevenin equivalent of resistors 17 and 18 and capacitor 19. This time constant is further modified by the effective gain of the circuit, i.e., resistors 14, 15 and 16. Illustratively, the values of resistors 15, 16, 17 and 18 and capacitor 19 may be suitably selected to provide a response that approximates that of the temperature of the armature. Selection of resistor 14 can likewise approximate effects due to field heating. By simultaneous selection of resistors 17 and 18, the threshold level at which the armature and field currents start to slew the amplifier and below which the amplifier, still integrating, slews toward reset analogously simulates cooling.

The output of the operational amplifier 11 is delivered to a lead 20. The minimum signal permitted to appear on lead 20 is controlled by a breakpoint circuit connected in parallel with the RC time constant circuit and including a resistor 21, a diode 22, and a second resistor 23.

In connection with one set of conventional parameters of such a vehicle drive motor, the armature current may have a maximum value established by the control of approximately 500 amps in field weakening mode and the breakpoint current controlled by the breakpoint circuitry may be caused to be approximately 350 amps. The controller 10 effects a limitation on the drive motor current by utilizing the signal on lead 20 to control the effective potential produced by the motor control potentiometer, illustratively shown as potentiometer 24, adjustment of which is effected by a conventional operator's accelerator pedal P. The control of the drive motor power by such potentiometer is well known in the vehicle art and no further description need be given here other than to point out that the control potential of the potentiometer is a negative potential and may be adjusted by application of a positive potential in an overriding manner. Thus, the signal on lead 20 is delivered to the base of a transistor 25 for controlling the overriding voltage applied to the potentiometer 24 through a diode 26.

As a result of the application of the overriding voltage to the potentiometer, which, as discussed above, is a function of the integrated motor current appearing as a control signal on lead 20, the effect of the vehicle operator depressing the accelerator pedal P so as to adjust the potentiometer 24 to demand greater power output of the drive motor, may be overridden by the control signal as a function of the integrated amount of current so as to anticipate an overheating condition of the motor and thereby effectively prevent damage thereto in the operation of the vehicle. The use of the integrating circuit permits the operator to apply a substantial overload current to the drive motor for a short period of time, such as upon acceleration of the vehicle from a standpoint or the like, while yet effectively preventing continued high power operation of the vehicle. Still more specifically, the amount of overriding of the potentiometer 24, being a function of the integrated current signal, provides a proportional overriding effect as a function of the length of time the overload is maintained as well as the amount of the overload.

As will be obvious to those skilled in the art, a plurality of similar signal-providing circuits may be connected to lead 20 through appropriate scaling resistors, with each having a different RC time constant circuit so as to provide different time delays for use with different permissible current values or different operating conditions, all of which effectively cause transistor 25 to adjust the potentiometer voltage as desired. Illustratively, a relatively short time constant of approximately six seconds may be provided by such an additional signal-producing circuit to allow maximum motor current to be obtained for a short period of time even though the 350 amp. limit is still in effect.

The invention further comprehends the inclusion in the current limiting controller of means for indicating to the user of the vehicle the thermal condition of the motor, and thus, an indication of an impairment of the system capabilities. In the illustrated embodiment, such indication is a function of the signal on lead 20 and is utilized to provide a sensible indication in the form of an audio signal produced by a loudspeaker 27.

Operation of the loudspeaker is provided from a conventional astable oscillator 28 which may produce, illustratively, a 700 Hz. signal delivered to a NOR gate 29. The oscillator circuit includes a conventional arrangement of resistors 43, 44 and 45 and capacitor 46. The NOR gate is further connected to a chopping integrated circuit 30 of conventional construction providing a one-half duty cycle operation of the NOR gate of approximately 0.4 seconds. The output of the NOR gate is delivered through a resistor 31 connected to the noninverting input of an amplifier 32. A mixer resistor 33 is connected between lead 20 and the input terminal of amplifier 32 so as to provide an input to the amplifier 32 proportional to the integrated current signal delivered thereto through mixer resistor 33 as a 700 Hz. half-duty cycle signal, which is biased negatively in proportion to the integrated current. Resistor 47 produces an opposing positive bias.

The amplifier is provided with the conventional circuit resistors 34 and 35, and the output thereof is connected through a coupling capacitor 36 to a push-pull amplifier 37 including a pnp power transistor 38 and an npn power transistor 39 connected in the conventional push-pull manner between the positive and negative power supply terminals through suitable regulating resistors 40 and 41, respectively. The positive bias of resistor 47, nominally 100 k., is overwhelmed by the negative bias of resistor 33, nominally 19.6 k., when amplifier 11 is slewed negatively. However, when amplifier 11 has traversed in the positive direction from full negative, amplifier 32 will begin to come out of negative saturation. As the positive slew of amplifier 11 continues, the magnitude of the coupled audio beep will increase to the clamp light caused by resistors 21 and 23. The output of the push-pull amplifier is coupled through a capacitor 42 to the coil of the loudspeaker 27 so as to provide an output audio signal which varies in volume corresponding to the integrated current signal on lead 20 and, thus, corresponding to the amount of override being provided on the potentiometer 24, thereby to provide a positive indication to the vehicle operator of the thermal current limiting functioning of the controller 10.

As will be obvious to those skilled in the art, the means for indicating the thermal current limiting condition to the vehicle operator may comprise other suitable variable indicating means, such as visual means, variable frequency audio means, etc. In the illustrated embodiment, the control circuit parameters are selected so as to cause no audio signal from loudspeaker 27 when the output signal on lead 20 is full negative and to cause maximum loudness of the sound generated by loudspeaker 27 when the maximum potentiometer override signal is produced. Thus, a substantially positive warning to the vehicle operator of the integrated over-power condition is given by the thermal current limiting controller to permit the vehicle operator to more efficiently utilize the thermal capacity of the vehicle drive motor.

The foregoing disclosure of specific embodiments is illustrative of the broad inventive concepts comprehended by the invention.

I claim:

1. In an electrically propelled vehicle provided with an electric drive motor having variable field and armature currents flowing therethrough for variably propelling the vehicle, the improvement comprising:
   first signal supply means for providing a first input signal corresponding to the heating effect of the field current being provided to the motor;
   second signal supply means for providing a second input signal corresponding to the heating effect of the armature current being provided to the motor;
   integrating means for producing a control signal proportional to the integral of said input signals with respect to time to represent calculated temperature conditions of the drive motor resulting from the total motor currents; and
   output means responsive to said control signal to limit the motor currents suitably to prevent the temperature of the motor from exceeding a preselected rated maximum temperature thereof.

2. The vehicle apparatus of claim 1 wherein said vehicle includes an adjustable voltage control for adjusting the motor current as a function of the adjusted voltage and said output means defines means for limiting the voltage of said control.

3. The vehicle apparatus of claim 1 wherein said integrating means includes means providing a preselected time constant for providing said control signal only during a period of time determined by said time constant means.

4. The vehicle apparatus of claim 1 further including means responsive to said control signal for providing a sensible indication of the calculated temperature condition.

5. The vehicle apparatus of claim 1 wherein said integrating means includes at least one means providing preselected time constants for providing said control signal only during the time determined by said time constant means.

6. The vehicle apparatus of claim 1 further including means for causing current flow in the motor as demanded by the vehicle operator, and means for overriding said demand to anticipate a maximum overheated condition of the drive motor whereby the operator may apply a substantial overload current to the drive motor only for a maximum short preselected period of time to prevent continuous high current operation of the drive motor.

7. The vehicle apparatus of claim 1 further including means for providing a sensible signal corresponding in intensity to the calculated temperature concurrently with the limiting of the motor current.

8. The vehicle apparatus of claim 1 further including means for providing a variable loudness audio signal corresponding to the calculated temperature concurrently with the limiting of the motor current.

9. The vehicle apparatus of claim 1 further including means for providing an intermittent variable loudness audio signal corresponding to the calculated temperature concurrently with the limiting of the motor current.

10. The vehicle apparatus of claim 1 further including means for producing an alarm having an intensity proportional to the integral of the motor current with respect to time taken over a preselected period of time.

11. The vehicle apparatus of claim 10 wherein said alarm means comprises means for producing a variable loudness audio signal.

12. The vehicle apparatus of claim 10 wherein said output means comprises means for producing signal.

13. The vehicle apparatus of claim 10 further including means for producing a variable demand signal for causing variable current flow through the motor and means responsive to said control signal for limiting the demand signal producible by said signal producing means.

14. The vehicle apparatus of claim 11 wherein said alarm means is arranged to provide a zero indication as an incident of the calculated temperature condition being below a preselected minimum value.

15. The vehicle apparatus of claim 10 wherein said alarm means includes integrating means producing a preselected time constant.

16. The vehicle apparatus of claim 11 wherein said means for producing the alarm includes a variable indicator, an oscillator, an amplifier connecting said oscillator to said indicator, and means connected to the amplifier to control the magnitude of the indication produced by the variable indicator.

17. The vehicle apparatus of claim 17 wherein said indicator comprises a variable sound producing device.

18. The vehicle apparatus of claim 1 further including a potentiometer control for providing a negative voltage signal for use in controlling the motor currents, said output means providing a positive voltage override signal to the potentiometer for changing the value of the negative voltage signal provided therefrom in different adjusted positions of the potentiometer.

19. The vehicle apparatus of claim 1 further including a potentiometer control for providing a negative voltage signal for use in controlling the motor currents, and a food pedal operated means for adjusting the potentiometer, said output means providing a positive voltage override signal to the potentiometer for changing the value of the negative voltage signal provided therefrom in different adjusted positions of the potentiometer.

* * * * *